Patented Oct. 27, 1953

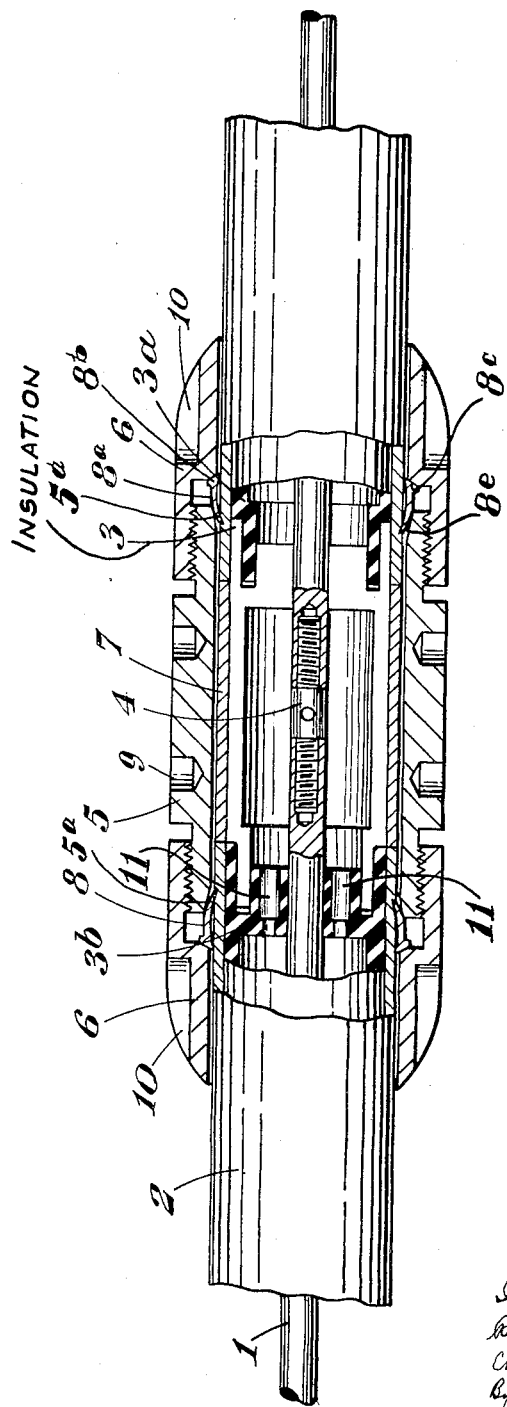

2,657,252

UNITED STATES PATENT OFFICE 2,657,252

JOINT FOR COAXIAL ELECTRICAL CABLES

Raymond Charles Mildner, Oxhey, and Clive Edward Christopher Lovelace, Blackheath, London, England, assignors to Telegraph Construction & Maintenance Company Limited, London, England, a British company Application February 27, 1950, Serial No. 146,568
In Great Britain February 28, 1949

7 Claims. (Cl. 174—88)

The invention relates to joints for electric cables and is concerned more particularly with the jointing of a tubular conductor surrounding one or more other conductors. Such a conductor may be the outer conductor of a co-axial cable, whether with gaseous or solid dielectric, or it may also be the sheathing of a single or multi-core cable.

The problem which arises in jointing lengths of cable together is two-fold. Aluminium is coming more into use in place of lead for the sheathing of cables with solid dielectric, and the temperature required for making a welded aluminium joint is usually too high for the insulation protected by the sheath. Moreover, the conductors inside the sheath must of necessity be exposed for the purpose of jointing, and then a gap is left in the sheath, over which a piece of protective material must be provided to cover the joint and to form the metallic bond between the sheaths of the two ends of cable.

In the case of co-axial cable the central conductor has to be jointed, for which purpose a space must also be left between the ends of the two outer conductors to provide access. It is then required to bridge the gap between the ends of the outer conductors in such a manner as to constitute the equivalent of a straight through conductor. Now, with the high frequencies transmitted along co-axial cables it is important that the characteristic impedance should remain uniform along the cable and through the joint. If there is any change in the bore of the outer conductor or any lack of electrical continuity, there is an abrupt change of characteristic impedance, which would cause disturbing reflections of the current being transmitted.

It is known that two pipes may be coupled together by a main coupling element having both ends tapered internally and a shoulder at each end against which the respective pipes can butt. A flanged nut screwed on each end of the coupling element drives a metallic packing ring into engagement with the outer surface of the pipe by pressing it into the flared end of the coupling element. Where the pipe has nothing inside it and is destined to carry a liquid or gas, no difficulty arises in assembling the joint. Where, however, there is something inside the pipe or tubular member such as another conductor, the inner conductors must be jointed, and it is not possible for performing this operation to thread the coupling member on to the pipe or tubular member to be jointed, because its bore is made equal to the bore of the pipe.

According to the invention a joint between two lengths of tubular conductor surrounding one or more other conductors comprises a main coupling element having an internal bore of a diameter to pass over the tubular conductor and having both ends flared internally, a sleeve split axially to fit inside the main coupling element over the joint of the inner conductor or conductors and to butt against the respective ends of the tubular conductor, a metallic packing ring at each end adapted to be forced into engagement with the outer surface of the tubular conductor when driven into the flared end of the main coupling element, and a flange nut screwed on each end of the main coupling element to force the respective packing ring into the said flared end.

The invention is illustrated by the accompanying drawing which shows a longitudinal section through a joint between two lengths of co-axial cable in accordance with the invention.

Referring to the drawing, the co-axial cables to be jointed each comprise an inner copper rod conductor 1, an outer aluminium sheath 2 concentric with the conductor 1, which constitutes the outer conductor, and polythene spacers or thimbles to maintain the conductor 1 truly central with the sheath 2 throughout the length of the cable. An insulating thimble structure is shown at 3 and has its ends shaped to fit corresponding adjacent thimbles 3a and 3b of which parts only are shown. The inner conductors 1 are drilled and tapped axially at their ends, one with left-handed thread, the other with right-handed. A ferrule 4 has a head of the same diameter as the conductor 1 and projecting therefrom in opposite directions screw threads of opposite hand to enter the tapped holes in the two conductors 1.

To make the joint in the inner conductor the two conductor ends are brought into contact with the ends of the screwed portions of the ferrule 4. The head of the ferrule is then turned until both conductor ends are against the shoulders of the ferrule adjacent to the screw threaded portions. In jointing the inner conductor in this manner a gap has of necessity been left between the ends of the outer conductor, which must be filled up when jointing the two ends together.

The joint for the outer conductor comprises a main coupling element 5 of sufficiently large bore to slip over the sheath 2, together with two nuts or end caps 6 screwed on to the ends of the element 5 and also of a bore to fit over the sheath 2.

To fill up the gap between the adjacent sheath ends and to provide a bore equal to that of the sheath, a sleeve 7 is made in two halves by a longitudinal slit along a diametral plane. The sleeve 7 has bore and outside diameter respectively equal to those of the sheath 2. For securing the joint firmly there is at each end a metallic ring 8 of a somewhat flexible metal rather harder than the sheath 2. Each ring 8 comprises a curved body portion 8a and enlarged foot 8b having a conical face 8c for engagement with the interior shoulder of the flanged nut 6. At its other end the body portion 8a tapers off to a knife edge 8e so that when the nut 6 is screwed home, as hereinafter explained, the curved outer face of the body portion 8a will be driven against a tapered seating 5a on the main coupling element 5 whereby the knife edge 8e will be caused to bite into the surface of the outer conductor.

To make a joint between two lengths of coaxial cable, the nut or end cap 6 and ring 8 are threaded in that order on to one cable end, while the other end cap 6, packing ring 8 and the coupling element 5 are threaded on to the other cable end. The inner conductors 1 after having been prepared are joined by means of the ferrule 4 to constitute a single conductor of uniform outside diameter. Thereupon the two halves of the sleeve 7 are put into place, the cable ends having been cut in such a manner that the sleeve will just fit between the two opposed ends of the sheath 2. An extra polythene thimble 3 in addition to those in the cable will have been placed in the cable before jointing the inner conductor 1 and will form a support for the half sleeves 7.

The parts threaded on to the outer conductor are then brought together into their right position on the cable, and the two end caps are screwed up tight on to the main coupling element 5. The inner ends of the rings 8 are pressed inwards by this action and embed themselves in the respective portions of the outer conductor or sheath 2. At the same time the screwing up of the end caps 6 tends to draw the ends of the sheath 2 towards each other, whereby the sleeve 7 is tightly gripped at the ends and there is produced in effect a continuous outer conductor at the joint of the same bore as the outer conductor of the two cables.

The sleeve 7 if split into two parts should be split accurately on the diameter. Alternatively, it may be split into more than two parts. All the parts can then be located by the polythene thimble 3. Again it could be split at one position only, being sprung into position after the inner joint is completed.

Where a joint of the kind described is used for a cable with solid insulation, whether for an active outer conductor or a protective sheath, the procedure is somewhat similar. The parts as described are threaded on to the respective cable ends. The internal conductors are jointed and then the split sleeve is put into position and the joint tightened up by means of the nuts 6.

It is usually advantageous to make the inner ends of the rings 8 serrated in order to assist them in biting into the sheath 2. Electrical continuity is thereby more certainly ensured.

Holes are provided in the thimble structure 3 and in the thimbles 3a and 3b to permit the passage of air or gas through the cable. The thimble 3b is shown as being provided with such holes, designated 11. Holes in the thimble structure 3 and the thimble 3a are not shown because of the positions of these parts relative to the plane of the section shown in the drawing.

What we claim is:

1. In a concentric conductor transmission line having adjacent lengths of tubular outer conductors having opposed ends, joined lengths of inner conductors therein, nuts surrounding opposed ends of said outer conductors and having internal chamfered faces, a coupling element between said opposed ends and being screw-threaded to said nuts and provided internally at each of its ends with a chamfered jointing surface, a split conductor sleeve shorter than and located within said coupling element and whose internal and external diameters are of the same dimension as those of the outer conductors, the opposite ends of said split sleeve being in abutting engagement with the adjacent ends of said outer conductors, said split sleeve enclosing the joint of the inner conductors, and packing rings each having an end engaged with the chamfered faces of the nuts for axial movement of the rings toward each other by the nuts, and each ring having the other end of knife-like shape so that on said axial movement through tightening the nuts, the packing rings will be deflected inwards by said chamfered jointing surfaces into biting engagement with the adjacent tubular outer conductor to force the same into abutting engagement with said sleeve.

2. A structure as defined in claim 1 in which the coupling element has interiorly tapered ends and in which the knife-like edges of the packing rings are serrated.

3. A structure as defined in claim 1 in which the sleeve has the same bore as each tubular conductor.

4. A structure as defined in claim 1 in which the sleeve has the same bore as each tubular conductor, and in which the inner conductor is jointed by means of a ferrule having right and left-handed threads to engage the conductor links and a head of the same external diameter as the inner conductor.

5. A joint as defined in claim 1 in which the sleeve is split on a diametral plane into two parts.

6. In a concentric conductor transmission line having tubular outer conductors having opposed ends and a gap therebetween, inner conductors within the outer conductors joined at the gap, nuts surrounding opposed ends of said outer conductors and having internal chamfered faces, a coupling element between said opposed ends and being screw-threaded to said nuts and provided internally at each of its ends with a chamfered jointing surface, a split conductor sleeve shorter than and located within said coupling element and whose internal and external diameters are of the same dimension as those of the outer conductors, the opposite ends of said split sleeve being in abutting engagement with the adjacent ends of said outer conductors, insulation within the split conductor sleeve centering the inner conductors and alining said split conductor sleeve with said outer conductors, and packing rings each having an end engaged with the chamfered faces of the nuts for axial movement of the rings toward each other by the nuts, and each ring having the other end of knife-like shape so that on said axial movement through tightening the nuts, the packing rings will be deflected inwards by said chamfered jointing surfaces into biting engagement with the adjacent tubular outer conductor to force the same into abutting engagement with said sleeve.

7. In a concentric conductor transmission line having tubular outer conductors having opposed ends and a gap therebetween, inner conductors within the outer conductors joined at the gap, nuts surrounding opposed ends of said outer conductors and having internal chamfered faces, a coupling element between said opposed ends and being screw-threaded to said nuts and provided internally at each of its ends with a chamfered jointing surface, a split conductor sleeve shorter than and located within said coupling element and internal and external diameters are of the same dimension as those of the outer conductors, the opposite ends of said split sleeve being in abutting engagement with the adjacent ends of said outer conductors, an insulating thimble structure within the split conductor sleeve centering the inner conductors and alining said split conductor sleeve with said outer conductors, insulation thimbles respectively within said opposed ends of said outer conductors, said insulating thimble structure at its ends being in interfitting engagement with said insulation thimbles respectively, and packing rings each having an end engaged with the chamfered faces of the nuts for axial movement of the rings toward each other by the nuts, and each ring having the other end of knife-like shape so that on said axial movement through tightening the nuts, the packing rings will be deflected inwards by said chamfered jointing surfaces into biting engagement with the adjacent tubular outer conductor to force the same into abutting engagement with said sleeve.

RAYMOND CHARLES MILDNER.
CLIVE EDWARD CHRISTOPHER LOVELACE.

References Cited in the file of this patent

UNITED STATES PATENTS

| Number | Name | Date |
|---|---|---|
| 2,110,421 | Moody | Mar. 8, 1938 |
| 2,156,772 | Seeley | May 2, 1939 |
| 2,207,522 | Smith et al. | July 9, 1940 |
| 2,209,152 | Daniels | July 23, 1940 |
| 2,497,706 | Wetherill | Feb. 14, 1950 |
| 2,530,153 | Davey et al. | Nov. 14, 1950 |